(12) United States Patent
Kim et al.

(10) Patent No.: US 8,042,872 B2
(45) Date of Patent: Oct. 25, 2011

(54) RECLINER FOR VEHICLE SEATS

(75) Inventors: Dong-Il Kim, Incheon (KR); Jae-Won Sim, Daejeon (KR)

(73) Assignee: Daewon Precision Industrial Co., Ltd., Ansan-shi, Kyunggi-do (KR)

( * ) Notice: Subject to any disclaimer, the term of this patent is extended or adjusted under 35 U.S.C. 154(b) by 294 days.

(21) Appl. No.: 12/497,961

(22) Filed: Jul. 6, 2009

(65) Prior Publication Data
US 2010/0231022 A1    Sep. 16, 2010

(30) Foreign Application Priority Data
Mar. 16, 2009    (KR) .................. 10-2009-0022258

(51) Int. Cl.
*B60N 2/235*    (2006.01)
(52) U.S. Cl. ................. 297/367 L; 297/367 R
(58) Field of Classification Search .............. 297/367 R, 297/367 L, 367 P
See application file for complete search history.

(56) References Cited

U.S. PATENT DOCUMENTS

| | | | |
|---|---|---|---|
| 4,770,464 A * | 9/1988 | Pipon et al. ................ | 297/367 R |
| 4,789,205 A * | 12/1988 | Pipon et al. ................ | 297/367 R |
| 5,216,936 A * | 6/1993 | Baloche .................... | 297/367 R |
| 5,678,895 A * | 10/1997 | Matsuura et al. ......... | 297/367 R |
| 6,676,217 B2 * | 1/2004 | Lange ....................... | 297/367 R |
| 6,883,869 B2 * | 4/2005 | Liu et al. ................... | 297/367 R |
| 7,380,883 B2 * | 6/2008 | Koumura ................... | 297/367 R |
| 7,517,021 B2 * | 4/2009 | Wahls et al. .............. | 297/367 R |
| 2007/0145800 A1 * | 6/2007 | Thiel et al. .................... | 297/367 |
| 2007/0176478 A1 * | 8/2007 | Ohba ............................ | 297/367 |

* cited by examiner

*Primary Examiner* — Peter R. Brown
(74) *Attorney, Agent, or Firm* — Arent Fox, LLP (57) ABSTRACT

The present invention provides a recliner for vehicle seats. The recliner includes a gear rim, a guide plate, a lever rotating shaft, a cam, elastic members, a main control disk, locking gears and locking gear support members. The gear rim has internal gear teeth. The guide plate is coupled to the gear rim and has guide blocks thereon. The lever rotating shaft is inserted through the gear rim and the guide plate. The cam has support protrusions on both ends thereof. The elastic members are provided on the inner surface of the guide plate, and each elastic member elastically supports a first end of the corresponding support protrusion. The main control disk is coupled to the cam. Inner and outer guide holes are formed through the main control disk. The locking gears are slidably provided between the facing guide blocks, and each locking gear has a support depression. The support depression has a concave curved surface and a convex curved surface. External gear teeth are formed in each locking gear. Each locking gear support member has a first contact surface which is in close contact with the concave curved surface of the support depression, a second contact surface which is in close contact with the corresponding guide block, and an inner surface which is supported on both ends thereof by the cam.

6 Claims, 10 Drawing Sheets

RECLINER FOR VEHICLE SEATS

BACKGROUND OF THE INVENTION

1. Field of the Invention

The present invention relates generally to recliners for vehicle seats and, more particularly, to a recliner which is mounted to a vehicle seat to function as a hinge for rotatably coupling a seat back to a seat cushion and enabling the angle of the seat back relative to the seat cushion to be adjusted to and stay fixed at the adjusted angle, thus providing the optimal seating posture to a user, and which is strong enough to protect the user when a vehicle collision occurs.

2. Description of the Related Art

Hereinafter, a representative example of the related art and problems thereof will be explained in detail with reference to the drawing.

Figure 1:
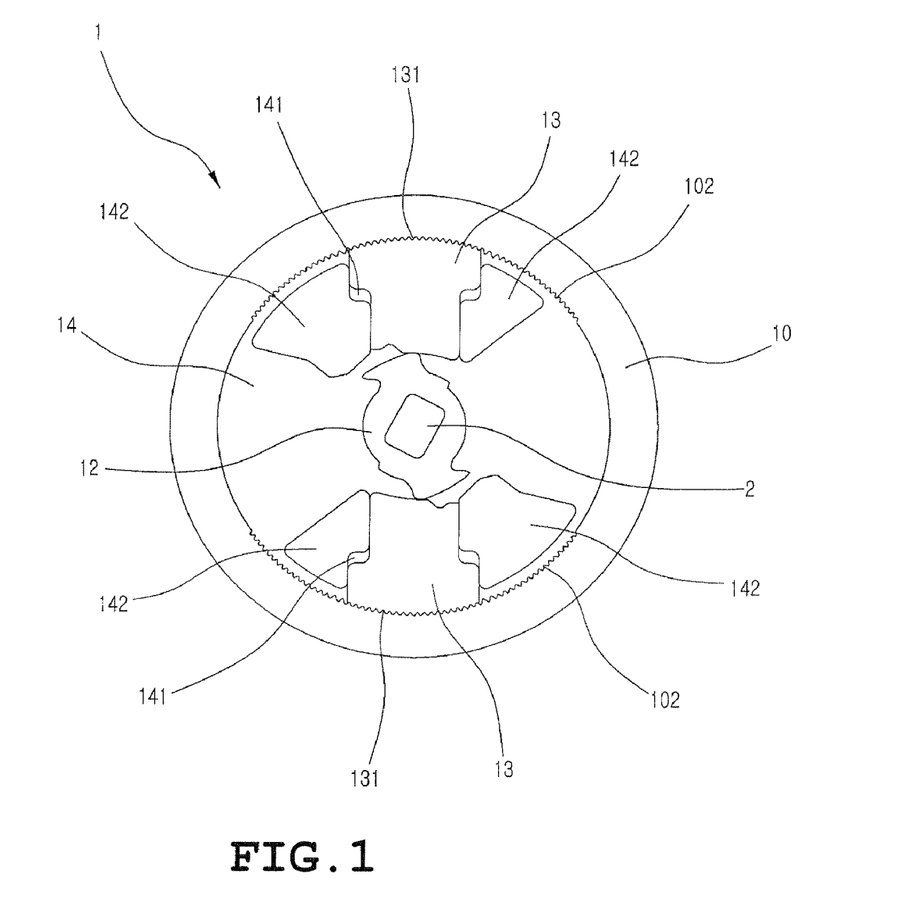
FIG. 1 is a view illustrating the construction of a recliner for vehicle seats according to a conventional technique.

FIG. 1 is a view showing the construction of a conventional recliner for vehicle seats.

Referring to FIG. 1, the conventional recliner 1 includes a gear rim 10, a guide plate 14, a cam 12 and locking gears 13. The gear rim 10 has a receiving depression (not shown) in a first surface thereof. Internal gear teeth 102 are formed in the rim part of the receiving depression. The guide plate 14 is attached to the first surface of the gear rim 10. A plurality of guide blocks 142 protrude from a second surface of the guide plate 14. The two facing guide blocks 142 define a locking gear guide depression 141. The cam 12 is interposed between the guide plate 14 and the gear rim 10 and is fitted at the center thereof over a lever rotating shaft 2. Each locking gear 13 is inserted into the corresponding locking gear guide depression 141. External gear teeth 131 are formed in the circumferential outer surface of each locking gear 13.

In the conventional recliner 1 having the above-mentioned construction, when the lever rotating shaft 2 rotates in a clockwise direction, both ends of the cam 12 which rotates along with the lever rotating shaft 2 push the diametrically opposed inner surfaces of the locking gears 13 towards the outside of the guide plate 14. Thereby, the locking gears 13 move along the corresponding locking gear guide depressions 141, so that the external gear teeth 131 of the locking gears 13 engage with the internal gear teeth 102 of the gear rim 10, thus entering the locked state.

However, in the conventional recliner 1, because of the structural characteristics in that each locking gear 13 slides along the corresponding locking gear guide depression 141, fine gaps for ensuring the movement of the locking gear 13 are formed between both sidewalls of the locking gear 13 and the inner surfaces of the corresponding guide blocks 142 which define the locking gear guide depression 141 therebetween. Furthermore, because the locking gear 13 repeatedly slides along the locking gear guide depression 141, abrasion is induced on both sidewalls of the locking gear 13 and the inner surfaces of the guide blocks 142 because of friction therebetween. Therefore, as the number of times the recliner is used increases, gaps between the locking gear 13 and the guide blocks 142 is gradually increased, with the result that the seat back undesirably moves around the rotating shaft, thus causing inconvenience to the user.

Moreover, when external force is applied to the recliner 1, a force applied to each locking gear 13 by the external force is focused on the sidewall of one of the guide blocks 142 that are disposed on both sides of the locking gear 13. Thereby, the locking gears 13 or the guide blocks 142 are easily deformed. In the case where the locking gears 13 or the guide blocks 142 are deformed, clearance between the locking gears 13 and the guide blocks 142 is increased. Thus, the seat back moves at an undesirably large angle around the rotating shaft.

In addition, when the recliner is in the locked state, only small areas of the cam 12 are in contact with and supporting the locking gear 13. Stress is focused on the cam 12, with the result that the cam 12 is easily deformed or damaged.

SUMMARY OF THE INVENTION

Accordingly, the present invention has been made keeping in mind the above problems occurring in the prior art, and an object of the present invention is to provide a recliner for vehicle seats which is constructed such that even if gaps are formed between locking gears and locking gear support members or abrasion is induced by friction therebetween, clearance can be prevented from being formed between the locking gears, the locking gear support members and the guide blocks, thus preventing a seat back from undesirably moving more than intended around a rotating shaft of the seat back when the recliner is in the locked state.

Another object of the present invention is to provide a recliner for vehicle seats which can disperse force applied to each locking gear by external force, rather than focusing on only one of the guide blocks that are disposed on both sides of the locking gear, thus preventing the locking gears or the guide blocks from becoming deformed.

A further object of the present invention is to provide a recliner for vehicle seats which is configured such that even though external force is applied to the seat back, the locking gears and the locking gear support members are firmly supported by the cam, so that the locked state can be reliably maintained.

Still another object of the present invention is to provide a recliner for vehicle seats which can markedly enhance the assemblability and reduce the rate of variation in operating torque of the cam when it is unlocked.

In order to accomplish the above objects, the present invention provides a recliner for vehicle seats, including: a gear rim having a receiving depression in a front surface thereof, with internal gear teeth formed in a rim part of the receiving depression, and a first insert hole formed through a central portion of the gear rim; a guide plate coupled to the front surface of the gear rim by a clamp ring, with a second insert hole formed through a central portion of the guide plate, and a plurality of guide blocks provided on a rear surface of the guide plate at positions spaced apart from each other by predetermined distances; a lever rotating shaft inserted through the first and second insert holes of the guide plate and the gear rim; a cam fitted over the lever rotating shaft, with support protrusions provided on both ends of the cam, and power transmission protrusions provided on diametrically opposed sides of a rear surface of the cam; a pair of elastic members fastened to diametrically opposed portions of an inner surface of the guide plate, each of the elastic members elastically supporting on a first end thereof a first end of the corresponding support protrusion of the cam; a main control disk fitted over the lever rotating shaft and coupled to the power transmission protrusions of the cam, with outer guide holes formed through diametrically opposed portions of the main control disk, and inner guide holes formed through the main control disk at diametrically opposed portions which are closer to a center of the main control disk than are the outer guide holes; a pair of locking gears, each of which is slidably provided between the two facing guide blocks of the guide plate, each of the locking gears having a support depression in an inner surface thereof, the support depression having a concave curved surface inclined outwards from a lower end of a first surface of the locking gear to a medial portion of the locking gear, and a convex curved surface inclined inwards from a second end of the concave curved surface to a medial portion of a second surface of the locking gear, with external gear teeth formed in an outer surface of each of the locking gears, and a connection protrusion provided on a central portion of a rear surface of each of the locking gears, the connection protrusion being inserted into the corresponding outer guide hole of the main control disk; and a pair of locking gear support members interposed between the cam and the pair of locking gears, each of the locking gear support members having: a first contact surface in close contact with the concave curved surface of the support depression of the corresponding locking gear; and a second contact surface in close contact with a lower portion of a first surface of the guide block that is disposed adjacent to a second end of the locking gear, the locking gear support member being supported on both ends of an inner surface thereof by a circumferential outer surface of the cam.

The convex curved surface of the support depression of each of the locking gears may be spaced apart from an outer surface of the corresponding locking gear support member by a predetermined distance.

The second contact surface of each of the locking gear support member which is in close contact with the lower portion of the first surface of the guide block that is disposed adjacent to the second end of the locking gear may be inclined towards the lever rotating shaft from an upper end thereof to a lower end thereof.

Furthermore, a first end of the inner surface of each of the locking gears may further extend towards the cam such that the first end of the inner surface of the locking gear is supported by a second end of the corresponding support protrusion of the cam.

The first end of each of the elastic members which supports the first end of the corresponding support protrusion of the cam may be bent in a direction in which the cam rotates when entering an unlocked state.

In addition, a fitting part may be provided at a predetermined position around a circumferential outer surface of the lever rotating shaft. The fitting part may be inserted into the second insert hole of the guide plate. Planar portions may be formed on upper and lower portions of the fitting part. Triangular rotating angle limit protrusions may be provided on upper and lower portions of the second insert hole of the guide plate. Edges of the triangular rotating angle limit protrusions may be supported by the planar portions of the fitting part.

As described above, in the recliner for vehicle seats according to an embodiment of the present invention, when the recliner is in the locked state, a first end of an inner surface of each of locking gears is pushed by a corresponding support protrusion of the cam, so that a first surface of the locking gear is maintained in a state of being in close contact with a second surface of a guide block which is disposed adjacent to the first end of the locking gear. Simultaneously, the first end of the inner surface of the locking gear is maintained in a state of being supported by the corresponding support protrusion of the cam. In addition, both ends of an inner surface of each of locking gear support members are pushed by the circumferential outer surface of the cam, so that a second surface of the locking gear support member is maintained in a state of being in close contact with a first surface of a guide block which is disposed adjacent to the second end of the locking gear support member. Simultaneously, both ends of the inner surface of the locking gear support members are maintained in the state of being supported by the circumferential outer surface of the cam. Therefore, the present invention can prevent clearance from being formed between the locking gears and the locking gear support members and between the locking gears and the inner surfaces of the guide blocks that are disposed adjacent to both ends of the locking gear support members. Thereby, when the recliner is in the locked state, the seat back can be prevented from undesirably moving around the rotating shaft, thus enhancing the reliability of the product.

Furthermore, in the recliner for vehicle seats according to the present invention, even though external force is applied to the recliner, the force applied to each locking gear by the external force is dispersed, rather than being focused on one of the guide blocks that are disposed adjacent to the first and second ends of the locking gears. Therefore, the locking gears or the guide blocks are prevented from being deformed, thus preventing the external gear teeth of the locking gears and the internal gear teeth of the gear rim from being incorrectly or loosely engaged with each other. Thereby, the durability and strength of the recliner in the case of a vehicle collision can be enhanced, so that the thickness of the material of the recliner and the size of the product can be reduced, compared to that of the conventional technique. As a result, the production cost can be reduced.

Moreover, in the locked state of the recliner for vehicle seats according to the present invention, both ends of the inner surface of the locking gear support member are supported by the circumferential outer surface of the cam. When external force is applied to the seat back, the first end of the inner surface of the locking gear is also supported by the support protrusion of the cam. Accordingly, even though external force is applied to the seat back, the locking gears and the locking gear support members can be firmly supported by the cam, so that the locked state can be reliably maintained. Thus, the reliability of the products can be markedly enhanced.

As well, the recliner for vehicle seats according to the present invention is constructed such that when the lever rotating shaft rotates at a predetermined angle, it can no longer rotate because it is restricted by rotation angle limit protrusions. Therefore, when assembling the recliner, the state in which the elastic members elastically support the cam can be maintained, so that the assemblability can be markedly enhanced. Furthermore, the end of each elastic member is formed to be bent in the rotation direction of the cam when the recliner enters the unlocked state. As the cam rotates in the direction in which the recliner enters the unlocked state, a contact angle between the support protrusion of the cam and the end of the elastic member is gradually increased. Thereby, when entering the unlocking state, the rate of increase in the tension of the elastic member is reduced, so that the rate of variation in operating torque of the cam can be markedly reduced. As a result, the user can conveniently manipulate the recliner merely by a using relatively small amount of force.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 2:
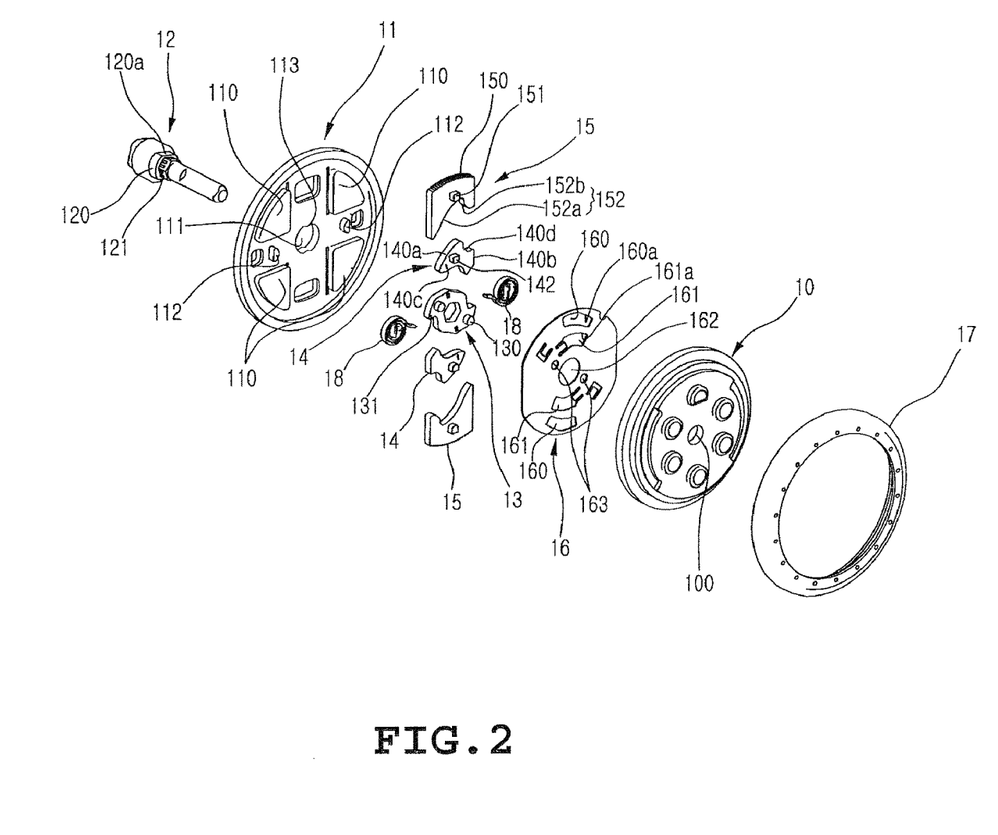
FIG. 2 is an exploded perspective view illustrating the construction of a recliner for vehicle seats, according to an embodiment of the present invention.
Figure 3:
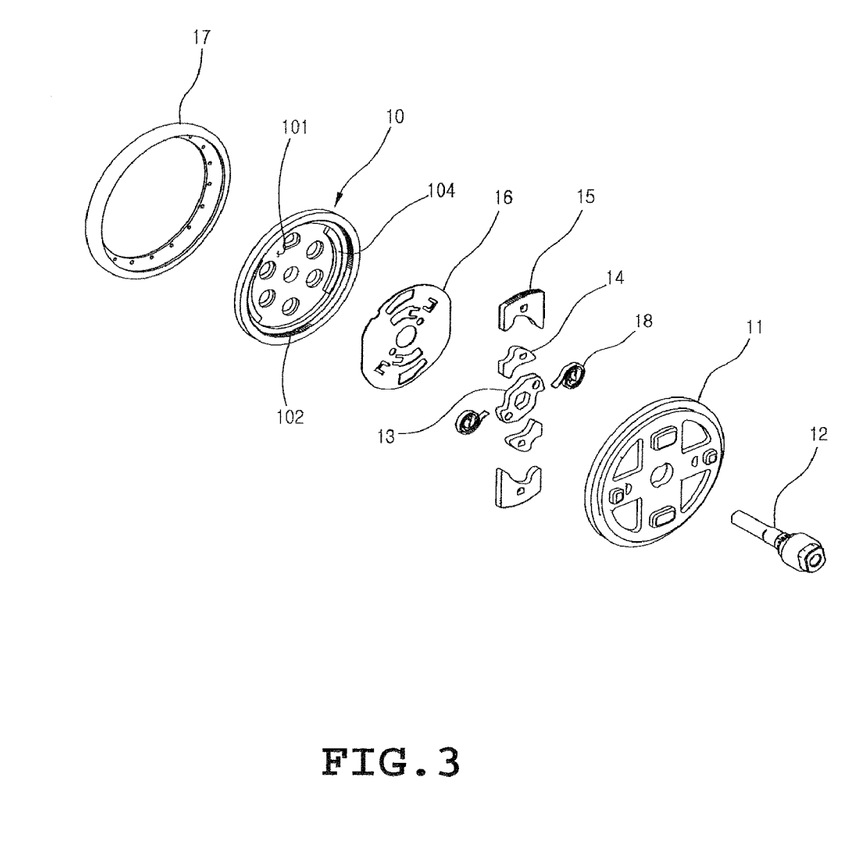
FIG. 3 is another exploded perspective view illustrating the construction of the recliner according to the embodiment of the present invention.
Figure 4:
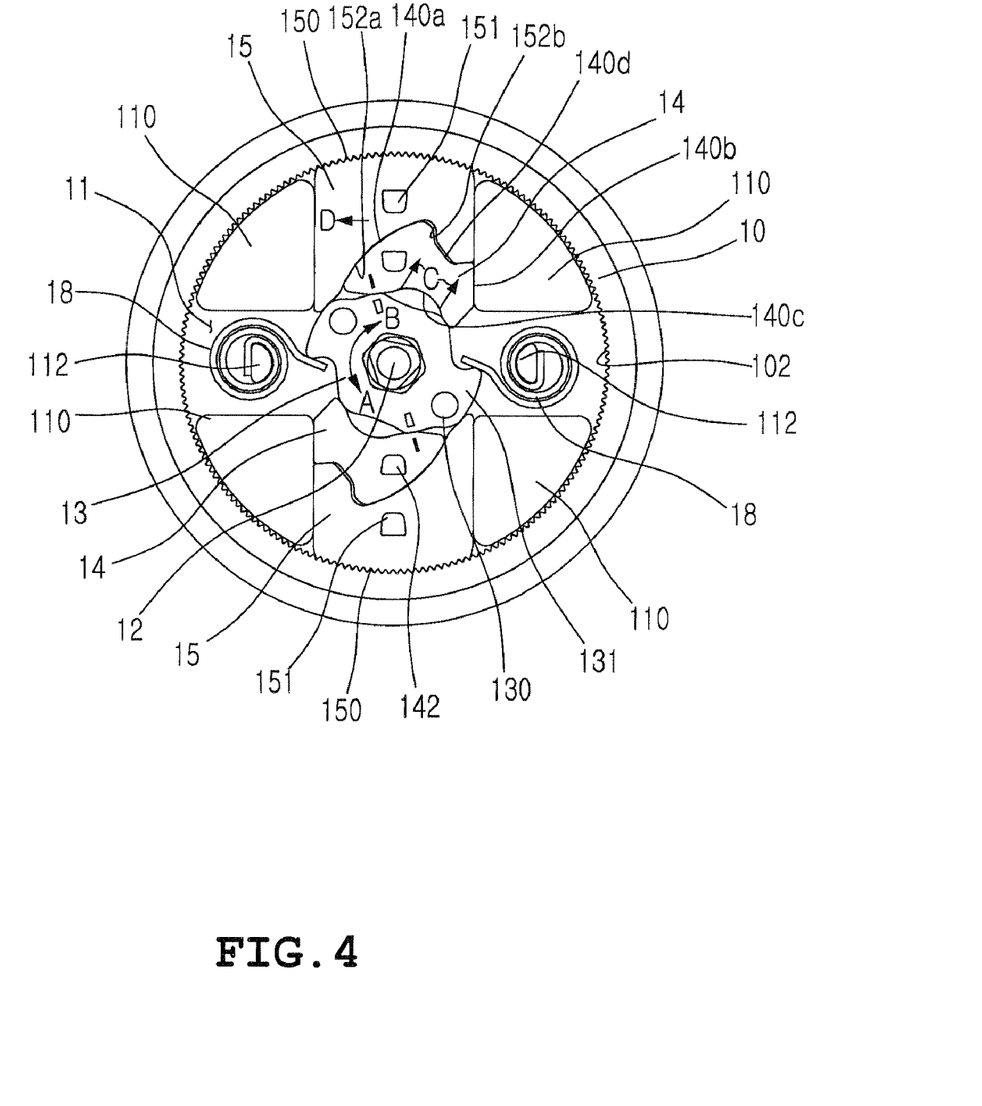
FIG. 4 is a view showing the installation of a cam, locking gear support members and locking gears according to the present invention.
Figure 5:
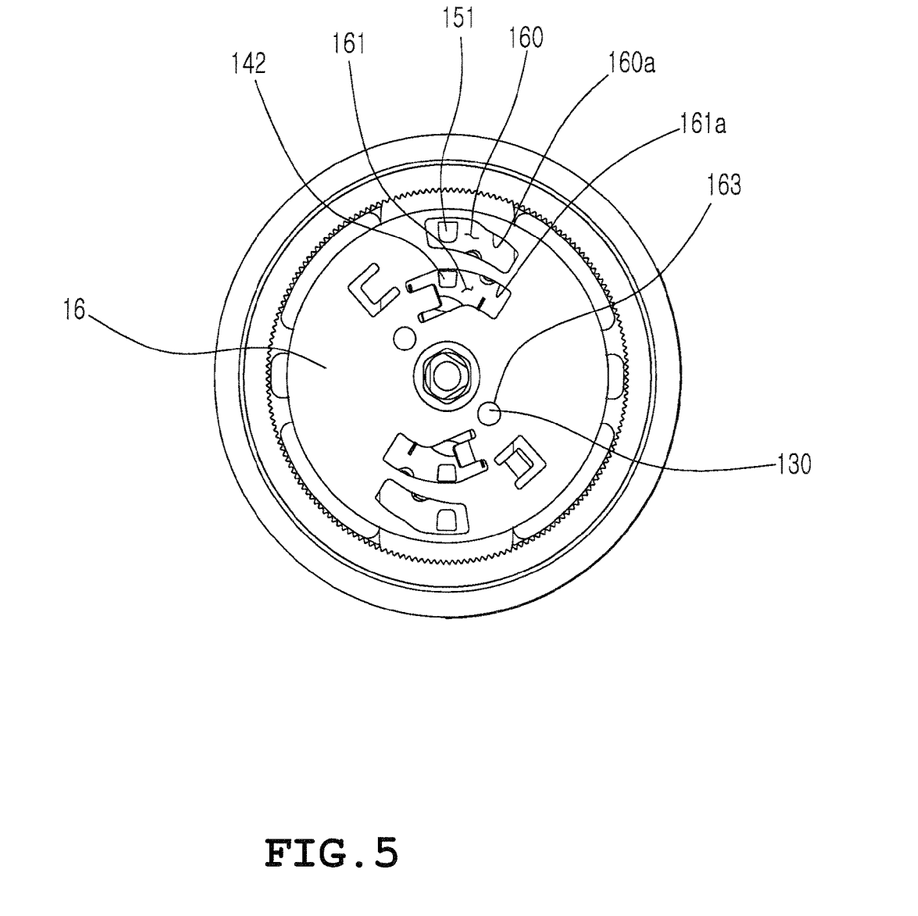
FIG. 5 is a view showing the installation of a main control disk in the state of FIG. 4.
Figure 6:
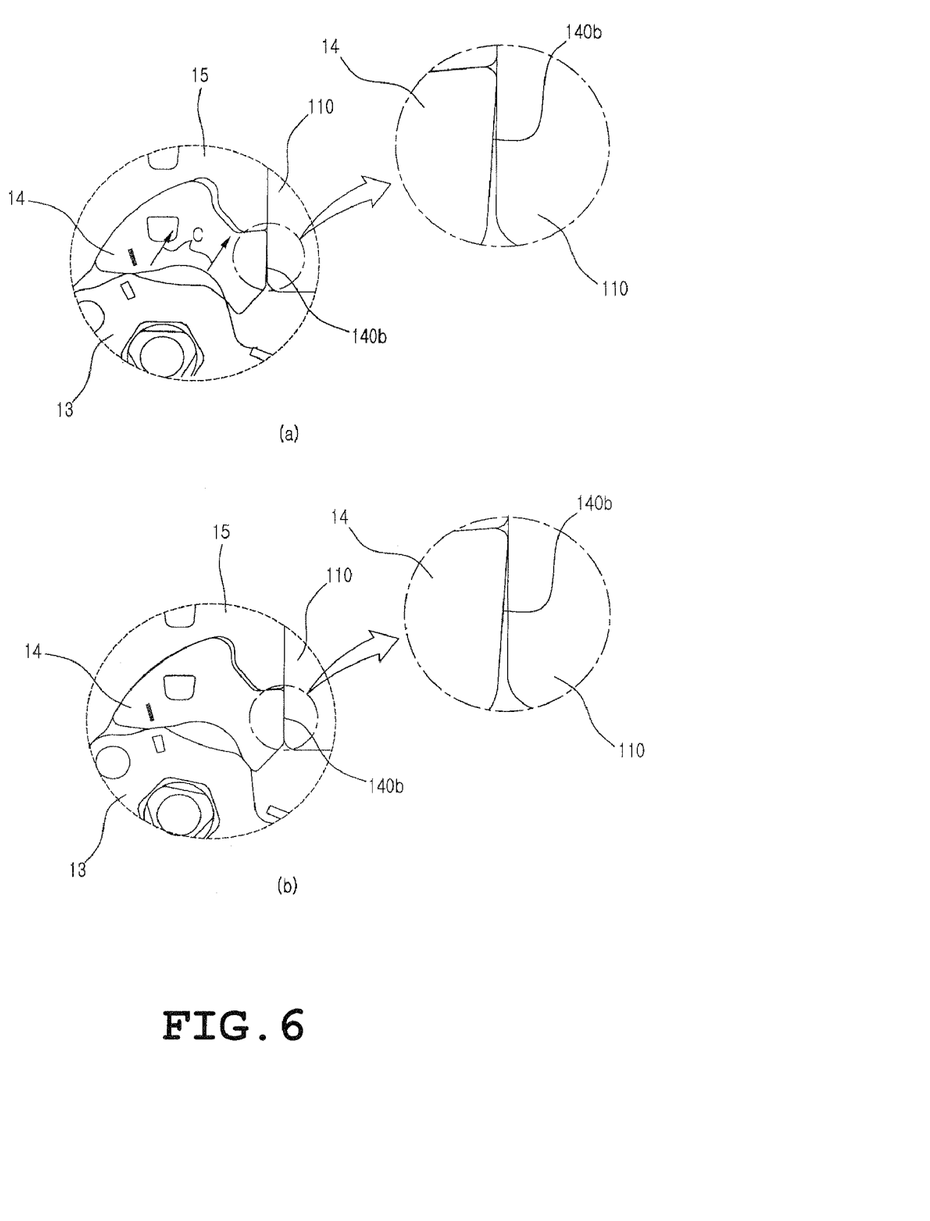
FIG. 6 is of views illustrating a process through which the locking gear support member comes into contact with a guide block when an unlocked state is converted into a locked state according to the present invention.
Figure 7:
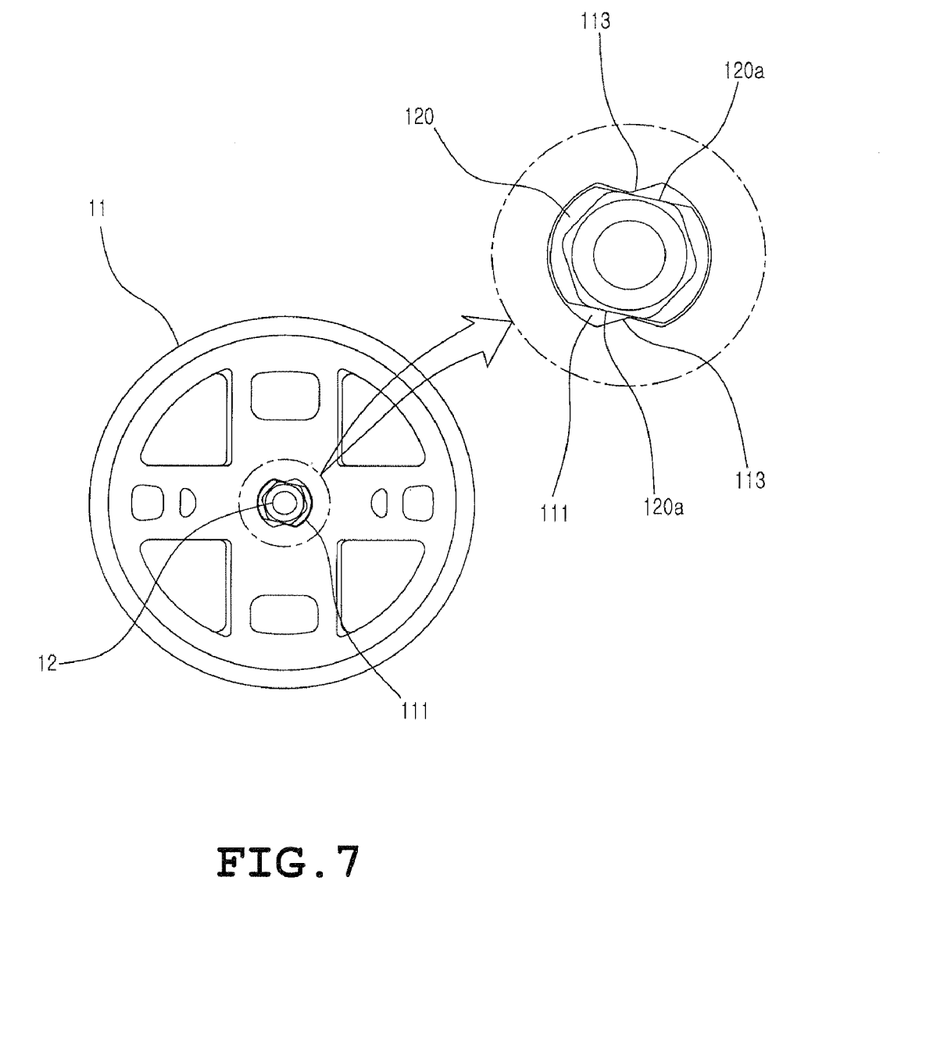
FIG. 7 is a view showing the main control disk fitted over a lever rotating shaft according to present invention.
Figure 8:
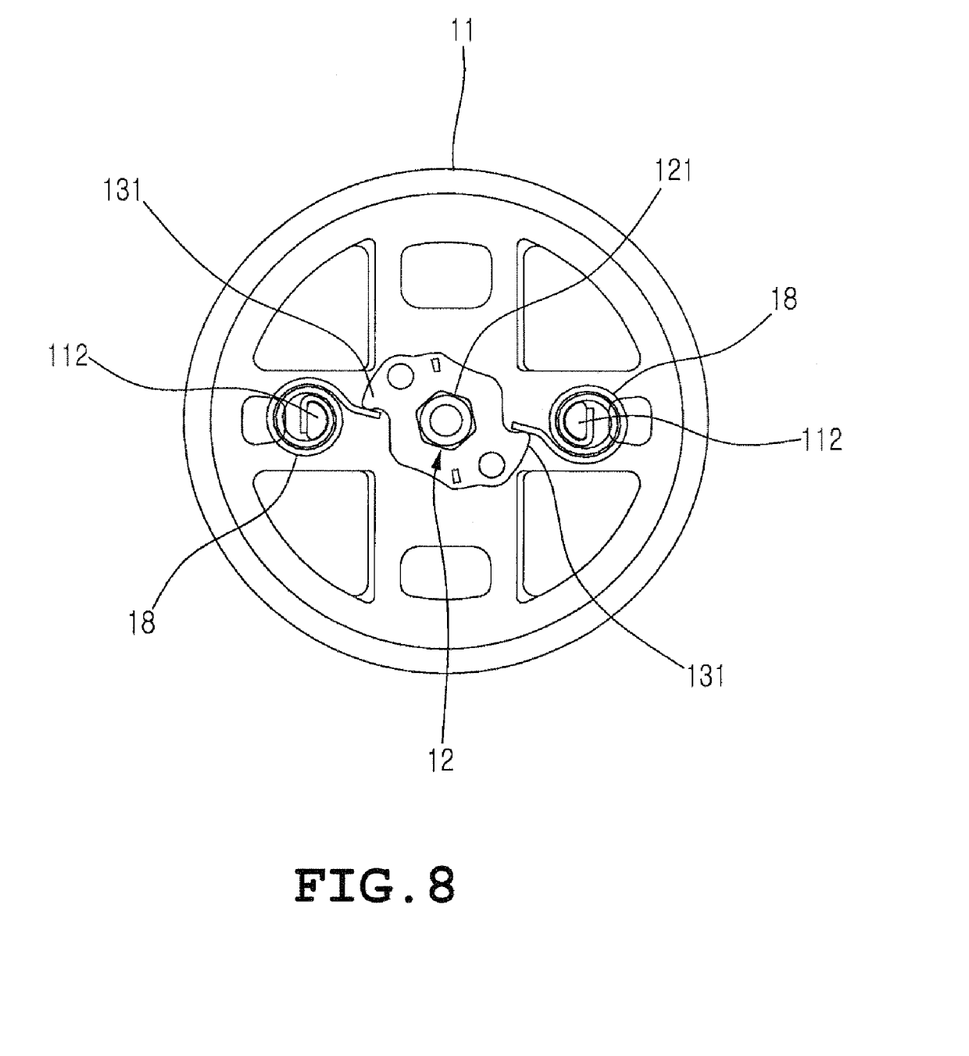
FIG. 8 is a view showing the installation of the cam and elastic members on a guide plate according to the present invention.

FIG. 2 is an exploded perspective view illustrating the construction of a recliner for vehicle seats, according to an embodiment of the present invention. FIG. 3 is another exploded perspective view illustrating the construction of the recliner according to the embodiment of the present invention. FIG. 4 is a view showing the installation of a cam 13, locking gear support members 14 and locking gears 15. FIG. 5 is a view showing the installation of a main control disk 16 in the state of FIG. 4. FIG. 6 is of views illustrating a process through which the locking gear support member 14 come into contact with a guide block 110 when an unlocked state is converted into a locked state. FIG. 7 is a view showing the main control disk 16 fitted over a lever rotating shaft 12. FIG. 8 is a view showing the installation of the cam 13 and elastic members 18 on a guide plate 11.

Referring to FIGS. 2 through 8, the recliner for vehicle seats according to the embodiment of the present invention includes a gear rim 10, the guide plate 11, the lever rotating shaft 12, the cam 13, the elastic members 18, the locking gear support members 14, the locking gears 15 and the main control disk 16.

In the recliner according to the embodiment of the present invention, an insert hole 100 is formed through the central portion of the gear rim 10. A receiving depression 101 is formed in the front surface of the gear rim 10. Internal gear teeth 102 are formed in a rim part of the receiving depression 101. Close contact stepped portions 104 are respectively provided on opposite sides of the perimeter of the receiving depression 101 and bring the main control disk 16 into close contact with the locking gear 15.

The guide plate 11 is coupled to the front surface of the gear rim 10 using a clamp ring 17. A plurality of guide blocks 110 protrudes rearwards from the upper and lower portions of the rear surface of the guide plate 11. Mounting protrusions 112 protrude rearwards from both sides of the rear surface of the guide plate 11. An insert hole 111 is formed through the central portion of the guide plate 11. Rotation angle limit protrusions 113, each of which has a triangular shape, protrude inwards from the upper and lower edges of the insert hole 111.

The lever rotating shaft 12 has a fitting part 120 on a portion of the circumferential outer surface thereof. The fitting part 120 is fitted into the insert hole 111 of the guide plate 11. Planar portions 120a are formed on the upper and lower portions of the fitting part 120. A cam coupling part 121 having a polygonal shape is formed behind the fitting part 120 around the circumferential outer surface of the lever rotating shaft 12. The cam coupling part 121 passes through the insert holes 100 and 111 of the gear rim 10 and the guide plate 11 such that the fitting part 120 is inserted into the insert hole 111 of the guide plate 11. Here, the ends of the triangular rotating angle limit protrusions 113 which protrude from the upper and lower portions of the edge of the insert hole 111 of the guide plate 11 come into line contact with the planar portions 120a of the fitting part 120.

As such, the guide plate 11 is fitted over the lever rotating shaft 12 such that the ends of the rotation angle limit protrusions 113 are in contact with the planar portions 120a of the fitting part 120 of the lever rotating shaft 12. Therefore, as shown in FIG. 7, when the lever rotating shaft rotates at a predetermined angle in a clockwise or counterclockwise direction around the insert hole 111 of the guide plate 11, one side of each planar portion 120a of the fitting part 120 comes into contact with one side of the corresponding rotation angle limit protrusion 113, so that the lever rotating shaft 12 can no longer rotate.

Hence, as shown in FIG. 8, after the cam 16 is fitted over the cam coupling part 121 of the lever rotating shaft 12, it is sufficient if the elastic members 18 are installed on the mounting protrusions 112 of the guide plate 11 such that only the ends of the elastic members 18 elastically support the support protrusions 131 of the cam 13 which will be explained later. In other words, although the elastic members 18 are coupled to the mounting protrusions 112 of the guide plate 11 through the above-mentioned simple method, the state in which the elastic members 18 elastically support the cam 13 can be reliably maintained by virtue of the fact that when the lever rotating shaft 12 rotates at a predetermined angle, as shown in FIG. 7, it can no longer rotate because the planar portions 120a of the fitting part 120 are restricted by the rotation angle limit protrusions 113 formed in the insert hole 111 of the guide plate 11. Therefore, the present invention can markedly simplify the assembly process.

The cam 13 is interposed between the gear rim 10 and the guide plate 11 and is fitted over the cam coupling part 121 of the lever rotating shaft 12 such that it rotates along with the lever rotating shaft 12. Power transmission protrusions 130 are provided on both sides of the rear surface of the cam 13. The support protrusions 131 are formed on both ends of the cam 13.

The elastic members 18 are fitted over the mounting protrusions 112 of the guide plate 11 such that first ends of the support protrusions 131 of the cam 13 are elastically supported by the ends of the elastic members 18. The end of each elastic member 18 which elastically supports the corresponding support protrusion 131 of the cam 13 is bent in the direction in which the cam 13 rotates when the recliner enters the unlocked state. In other words, the end of the elastic member 18 provided on one side of the guide plate 11 is bent such that it is inclined downwards from the elastic member 18 towards the cam 13. The end of the elastic member 18 provided on the other side of the guide plate 11 is bent such that it is inclined upwards from the elastic member 18 towards the cam 13.

Meanwhile, an insert hole 162 into which the lever rotating shaft 12 is inserted is formed through the central portion of the main control disk 16. Power transmission holes 163 into which the power transmission protrusions 130 are inserted are formed through the main control disk 16 at predetermined positions adjacent to the insert hole 162. Furthermore, two outer guide holes 160 are respectively formed through diametrically opposed portions of the main control disk 16. As well, inner guide holes 161 are formed through the main control disk 16 at positions closer to the center of the main control disk 16 than are the outer guide holes 160. The main control disk 16 rotates along with the cam 13. The main control disk 16 is fitted over the lever rotating shaft 12 through the insert hole 162 such that it is interposed between the cam 13 and the gear rim 10.

It is preferable that an outside edge 160a of each outer guide hole 160 be inclined inwards from the medial portion thereof to one end thereof.

Furthermore, it is also preferable that an outside edge 161a of each inner guide hole 161 be inclined inwards from the medial portion thereof to one end thereof.

Each of the two locking gears 15 has a support depression 152 in the inner surface thereof. The support depression 152 has a concave curved surface 152a which is inclined outwards from a lower end of a first surface of the locking gear 15 to the medial portion of the support depression 152, and a convex curved surface 152b which is inclined inwards from a second end of the concave curved surface 152a to a medial portion of a second surface of the locking gear 15. The locking gear 15 has on the outer surface thereof external gear teeth 150 which are selectively engaged with the internal gear teeth 102 of the gear rim 10. A connection protrusion 151 is provided on the central portion of the rear surface of each locking gear 15. Each locking gear 15 is slidably provided between two facing guide blocks 110 such that the connection protrusion 151 is inserted into the corresponding outer guide hole 160 of the main control disk 16.

Each of the two locking gear support members 14 has a first contact surface 140a which engages with the concave curved surface 152a of the support depression 152 of the corresponding locking gear 15, and a second contact surface 140b which engages with a lower portion of a first surface of the guide block 110 that is disposed adjacent to the second end of the locking gear 15. Furthermore, an inner surface 140c of each locking gear support member 14 is concave. The locking gear support member 14 is interposed between the cam 13 and the corresponding locking gear 15 such that both ends of the locking gear support member 14 are supported by the circumferential outer surface of the cam 13.

Preferably, the convex curved surface 152b of the support depression 152 of each locking gear 15 is spaced apart from an outer surface 140d of the corresponding locking gear support member 14 by a predetermined distance.

Furthermore, the second contact surface 140b of the locking gear support member 14, which engages with the lower portion of the first surface of the guide block 110 that is disposed adjacent to the second end of the locking gear 15, is inclined towards the lever rotating shaft 12 from the outer end of the second contact surface 140b to the inner end thereof.

In addition, preferably, a first end of the inner surface of each locking gear 15 further extends towards the cam 13 such that it is supported by a second end of the corresponding support protrusion 131 of the cam 13.

The operation of locking and unlocking the recliner for vehicle seats according to the present invention will be explained in detail with reference to FIGS. 2 through 9.

Figure 9:
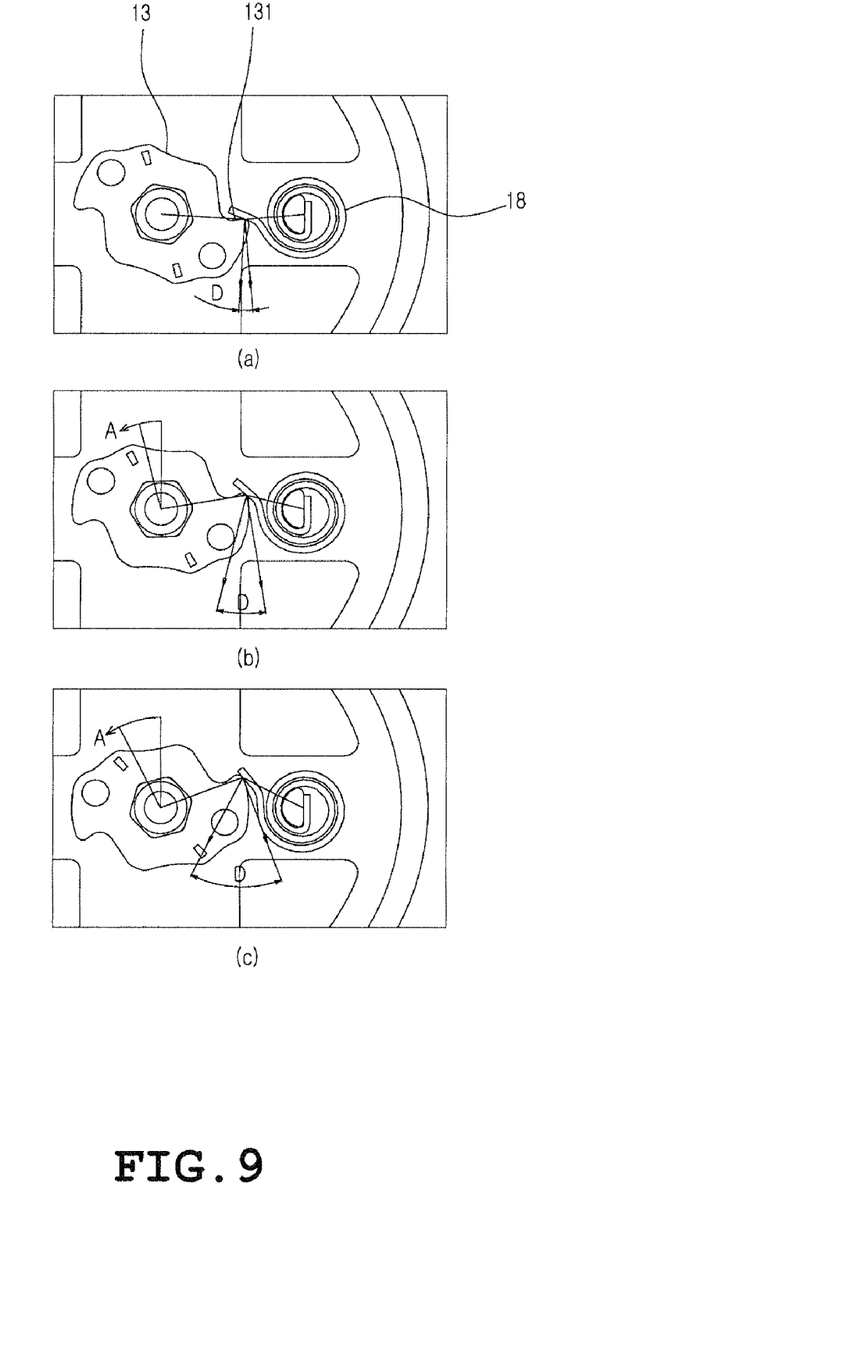
FIG. 9 is of views showing the operation of the cam compressing an end of the elastic member when entering the unlocked state according to the present invention.
Figure 10:
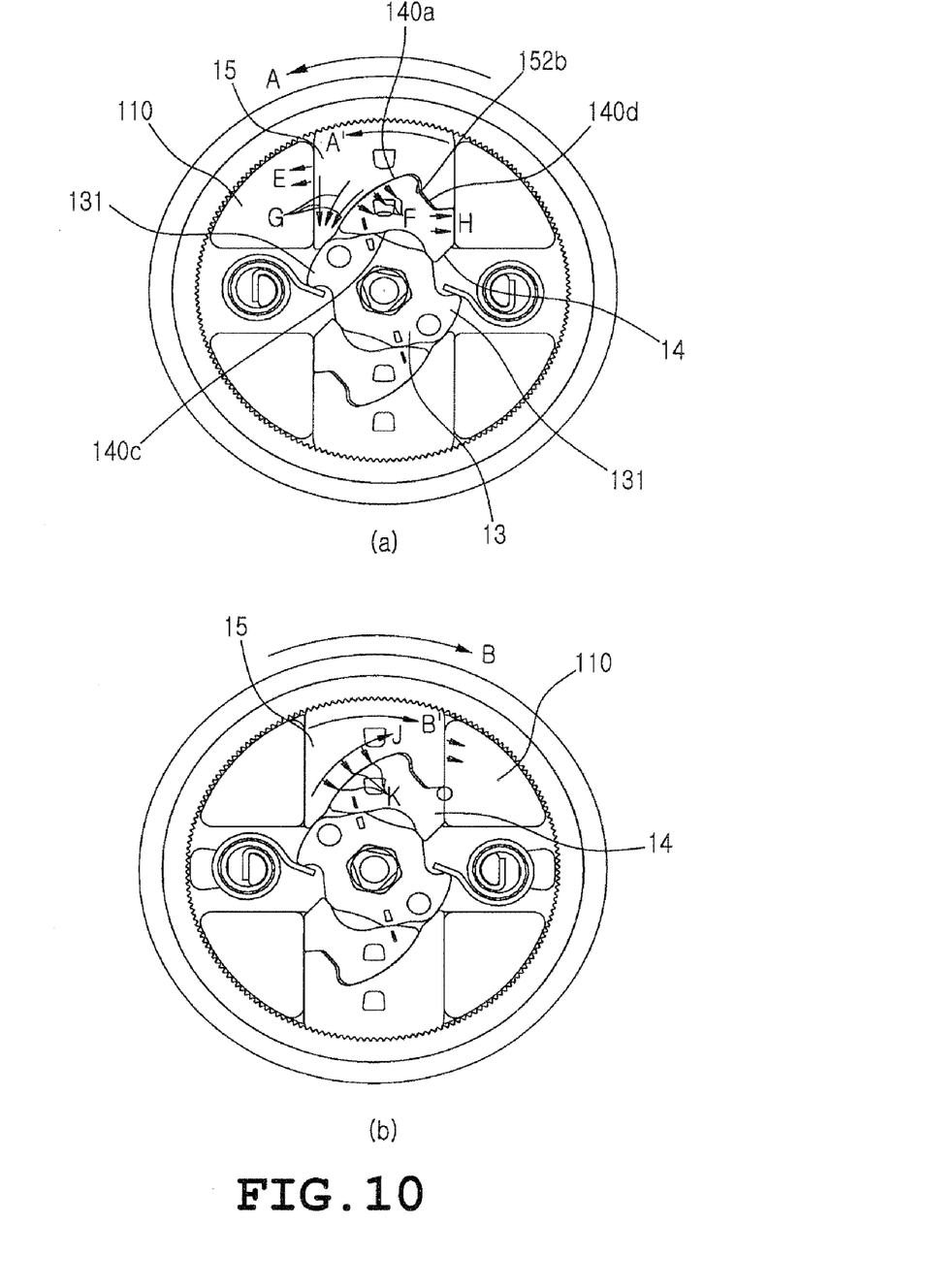
FIG. 10 is of views showing dispersion of external force when it is applied to the recliner in the locked state according to the present invention.

FIG. 9 is of views showing the operation of the cam 13 compressing an end of the elastic member 18 when the recliner enters the unlocked state. FIG. 10 is of views showing dispersion of external force when it is applied to the recliner in the locked state.

Referring to FIGS. 2 through 9, from the locked state of the recliner shown in FIGS. 4 and 5, when the lever rotating shaft 12 rotates in the direction of the arrow A, the cam 13 fitted over the lever rotating shaft 12 also rotates in the direction of the arrow A along with the lever rotating shaft 12. Simultaneously, the main control disk 16, which is fastened to the cam 13 by inserting the power transmission protrusions 130 of the cam 13 into the power transmission holes 163 of the main control disk 16, also rotates in the direction of the arrow A along with the cam 13.

At this time, because of the rotation of the main control disk 16 in the direction of the arrow A, the connection protrusions 151 of the locking gears 15 and connection protrusions 142 of the locking gear support members 14 which are respectively inserted into the outer guide holes 160 and the inner guide holes 161 of the main control disk 16 are compressed towards the lever rotating shaft 12 by the outside edges 160a of the outer guide holes 160 and the outside edges 161a of the inner guide holes 161 which are formed to be inclined towards the center of the main control disk 16. Thus, the locking gears 15 and the locking gear support members 14 slide towards the lever rotating shaft 12 along the inner surfaces of the guide blocks 110 of the guide plate 11 which face each other.

As such, when the locking gears 15 and the locking gear support members 14 move towards the lever rotating shaft 12 along the inner surfaces of the guide blocks 110 facing each other, the external gear teeth 150 of the locking gears 15 are removed from the internal gear teeth 102 of the gear rim 10. As a result, the recliner of the present invention enters the unlocked state.

At this time, the ends of the elastic members 18 which are supported by the mounting protrusions 112 are compressed in the direction of the arrow A by the rotation of the cam 13 in the direction of the arrow A. Here, the end of each elastic member 18 which supports the corresponding support protrusion 131 of the cam 13 is formed to be bent in the rotation direction of the cam 13 (in the direction of the arrow A) when the recliner enters the unlocked state. Thus, as shown in FIG. 9, when the cam 13 rotates in the direction of the arrow A, the support protrusion 131 of the cam 13 slides relative to the end of the elastic member 18 and compresses the end of the elastic member 18 in the direction of the arrow A in the state in which the support protrusion 131 is in close contact with the end of the elastic member 18. Hence, as the cam 13 rotates in the direction of the arrow A, a contact angle D between the support protrusion 131 of the cam 13 and the end of the elastic member 18 is gradually increased. As a result, as the cam 13 rotates in the direction of the arrow A, the tension of the elastic member 18 applied to the cam 13 is gradually reduced, so that the rate of variation in operating torque of the cam 13 can be markedly reduced by reducing the rate of increase of the tension of the elastic member 18 when the recliner is unlocked.

In detail, in the locked state shown in FIG. 9a, although the tension of the elastic member 8 is the smallest, because the contact angle D between the end of the elastic member 18 and the support protrusion 131 of the cam 13 is very small, the efficiency with which the tension of the elastic member 18 is transmitted to the cam 13 is very high. As shown in FIGS. 9b and 9c, as the cam 13 rotates in the direction of the arrow A, the end of the elastic member 18 is gradually compressed by the support protrusion 131 of the cam 13 so that the tension of the elastic member 18 is gradually increased. However, because the contact angle D between the end of the elastic member 18 and the support protrusion 131 of the cam 13 is increased by the rotation of the cam 13 in the direction of the arrow A, the efficiency with which the tension of the elastic member 18 is transmitted to the cam 13 is gradually reduced. Thus, the rate of increase of the tension of the elastic member 18 when the recliner is unlocked is reduced, so that the rate of variation in operating torque of the cam 13 can be reduced.

When the recliner of the present invention is in the unlocked state, the user adjusts the angle of the seat back relative to the seat cushion and removes the operating force which has been applied to the lever rotating shaft 12 in the direction of the arrow A. Then, the cam 13 is rotated in the direction of the arrow B by the restoring force of the elastic member 18 which has been compressed by the rotation of the lever rotating shaft 12. Because of the rotation of the cam 13 in the direction of the arrow B, the main control disk 16 and the lever rotating shaft 12 which are coupled to the cam 13 are also rotated in the direction of the arrow B and returned to their original states.

Simultaneously, the circumferential outer surface of the cam 13 which rotates in the direction of the arrow B applies pushing force to both ends of the inner surfaces 140c of the locking gear support members 14 in the direction of the arrow B. Thereby, the locking gear support members 14 are pushed in the direction of the arrow C.

At this time, as shown in FIG. 4, the outer surface 140d of each locking gear support member 14 is in a state of having been spaced apart from the convex curved surface 152b of the corresponding locking gear 15. Hence, when both ends of the inner surface 140c of the locking gear support member 14 are pushed by the circumferential outer surface of the cam 13 in the direction of the arrow C, as shown in FIG. 6a, the locking gear support member 14 rotates around the outer end of the second contact surface 140b in the direction of the arrow C in the state in which the first contact surface 140a of the locking gear support member 14 is in close contact with the concave curved surface 152a of the locking gear 15. Thus, as shown in FIG. 6b, the outer end of the second contact surface 140b of the locking gear support member 14 always maintains the state of being in close contact with the first surface of the guide block 110 that is disposed adjacent to the second end of the locking gear 15. In this state, the locking gear support member 14 slides towards the internal gear teeth 102 of the gear rim 10 and pushes the locking gear 15 towards it. Furthermore, as shown in FIG. 4, each locking gear 15 is biased in the direction of the arrow D by the cam 13 pushing the concave curved surface 152a of the locking gear 15. Thus, in the state in which a first surface of the locking gear 15 is in close contact with a second surface of the guide block 110 that is disposed adjacent to the first end of the locking gear 15, the locking gear 15 is pushed towards the internal gear teeth 102 by the locking gear support member 14 and the cam 13, so that the locking gear 15 moves in conjunction with the locking gear support member 14 towards the internal gear teeth 102.

Here, the outside edge 160a of the outer guide hole 160 of the main control disk 16 and the outside edge 161a of the inner guide hole 161 are inclined towards the center thereof with respect to the direction opposite the arrow A. Hence, as the main control disk 16 rotates in the direction opposite the arrow A, gaps are formed between the outer surfaces of the connection protrusions 151 and 142 of the locking gear 15 and the locking gear support member 14 and the outside edges 160a and 162a of the outer guide hole 160 and the inner guide hole 161 by the degree of inclination of the outside edges 160a and 161a of the outer and inner guide holes 160 and 161. Thus, the locking gear 15 and the locking gear support member 14 can slide towards the internal gear teeth 102 of the gear rim 10 along the inner surfaces of the left and right guide blocks 110 facing each other.

As such, when the locking gears 15 are moved by the cam 13 and the locking gear support members 14 towards the internal gear teeth 102 of the gear rim 10 along the inner surfaces of the left and right guide blocks 110 facing each other so that the external gear teeth 150 of the locking gears 15 engage with the internal gear teeth 102 of the gear rim 10, the recliner for vehicle seats according to the present invention enters the locked state such that the seat back that is adjusted in an angle by the user can be reliably maintained in the stationary position.

Furthermore, in the locked state of the recliner for vehicle seats according to the present invention, the inner surfaces 140c of the locking gear support members 14 are biased in the direction of the arrow B by the circumferential outer surface of the cam 13, so that the locking gear support members 14 are biased to be rotated in the direction of the arrow D around the outer ends of the second contact surfaces 140b. At this time, the outer ends of the second contact surfaces 140b always maintain the state of being in close contact with the inner surfaces of the guide blocks 110 that are disposed adjacent to the second ends of the locking gear support members 14. In addition, both ends of the inner surfaces 140c of the locking gear support members 14 maintain the state of being supported by the circumferential outer surface of the cam 13. Each locking gear 15 is biased in the direction of the arrow D by the first contact surface 140a of the corresponding locking gear support member 14, so that the first surface of the locking gear 15 maintains the state of being in close contact with the second surface of the guide block 110 that is disposed adjacent to the first end of the locking gear 15. Therefore, a gap is prevented from being formed between the locking gear 15 and the locking gear support member 14 and the inner surfaces of the guide blocks 110 that are disposed on the left and right sides of the locking gear 15 and the locking gear support member 14. Thus, the seat back that has been adjusted in an angle can be prevented from undesirably moving around the rotating shaft of the seat back, thereby enhancing the reliability of the product.

Furthermore, in the locked state of the recliner for vehicle seats according to the present invention, the concave curved surfaces 152a of the locking gears 15 are supported by the first contact surfaces 140a of the corresponding locking gear support members 14. Thus, as shown in FIG. 10a, when external force is applied to the recliner in the direction of the arrow A so that a force of the direction of the arrow A' is applied to the locking gears 15 by the external force, the force of the direction of the arrow A' is dispersed in the directions of the arrows E and F. As a result, a force of the direction of the arrow G is applied to the locking gear 15 by the forces that are dispersed in the directions of the arrows E and F.

At this time, the convex curved surface 152b of the locking gear 15 is in the state of being spaced apart from the outer surface 140d of the locking gear support member 14 by a predetermined gap. Thus, when the force of the direction of the arrow G is applied to the locking gear 15, the first end of the inner surface of the locking gear 15 is inserted in a wedging manner between the first contact surface 140a of the locking gear support member 14, the inner surface 140c of which is supported by the cam 13, and the second surface of the guide block 110 that is disposed adjacent to the first end of the locking gear 15. In this state, the first end of the inner surface of the locking gear 15 is supported by the support protrusion 131 of the cam 13.

Furthermore, because both ends of the inner surface 140c of the locking gear support member 14 are in the state of being supported by the cam 13, the force dispersed in the direction of the arrow F is changed into the force of the direction of the arrow H, and it is transmitted to and dispersed to the first surface of the guide block 110 that is disposed adjacent to the second end of the locking gear 15 and is in close contact with the second contact surface 140b of the locking gear support member 14.

In addition, in the locked state of the recliner for vehicle seats according to the present invention, because the concave curved surfaces 152a of the locking gears 15 are supported by the first contact surfaces 140a of the corresponding locking gear support members 14, if external force is applied to the recliner in the direction of the arrow B so that a force of the direction of the arrow B' is applied to the locking gears 15 by the external force, as shown in FIG. 10a, the force of the direction of the arrow B' is dispersed in the directions of the arrows J and K. The force of the direction of the arrow J is transmitted to and dispersed to the guide block 110 that is disposed adjacent to the second end of the locking gear 15. The force of the direction of the arrow K is transmitted to and dispersed to the locking gear support member 14 supported by the cam 13.

As described above, in the recliner for vehicle seats according to the present invention, even though external force is applied to the recliner, the force applied to each locking gear 15 by the external force is dispersed, rather than being focused on one of the guide blocks 110 that are adjacent to the first and second ends of the locking gears 15. Therefore, the shapes of the locking gears 15 or the guide blocks 110 are prevented from deteriorating, thus preventing the external gear teeth 150 of the locking gears 15 and the internal gear teeth 102 of the gear rim 10 from being incorrectly or loosely engaged with each other. Thereby, the durability and strength of the recliner against vehicle collision can be enhanced, so that the thickness of the material of the recliner and the size of the product can be reduced, compared to that of the conventional technique. As a result, the production cost can be reduced.

Moreover, in the locked state of the recliner for vehicle seats according to the present invention, both ends of the inner surface 140c of the locking gear support member 14 are supported by the circumferential outer surface of the cam 13. When external force is applied to the seat back, the first end of the inner surface of the locking gear 15 is also supported by the support protrusion 131 of the cam 13. Accordingly, even though external force is applied to the seat back, the locking gears 15 and the locking gear support members 14 can be firmly supported by the cam 13, so that the locked state can be reliably maintained.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A recliner for vehicle seats, comprising:
   a gear rim having a receiving depression in a front surface thereof, with internal gear teeth formed in a rim part of the receiving depression, and a first insert hole formed through a central portion of the gear rim;
   a guide plate coupled to the front surface of the gear rim by a clamp ring, with a second insert hole formed through a central portion of the guide plate, and a plurality of guide blocks provided on a rear surface of the guide plate at positions spaced apart from each other by predetermined distances;
   a lever rotating shaft inserted through the first and second insert holes of the guide plate and the gear rim;
   a cam fitted over the lever rotating shaft, with support protrusions provided on both ends of the cam, and power transmission protrusions provided on diametrically opposed sides of a rear surface of the cam;
   a pair of elastic members fastened to diametrically opposed portions of an inner surface of the guide plate, each of the elastic members elastically supporting on a first end thereof a first end of the corresponding support protrusion of the cam;
   a main control disk fitted over the lever rotating shaft and coupled to the power transmission protrusions of the cam, with outer guide holes formed through diametrically opposed portions of the main control disk, and inner guide holes formed through the main control disk at diametrically opposed portions which are closer to a center of the main control disk than are the outer guide holes;
   a pair of locking gears, each of which is slidably provided between the two facing guide blocks of the guide plate, each of the locking gears having a support depression in an inner surface thereof, the support depression having a concave curved surface inclined outwards from a lower end of a first surface of the locking gear to a medial portion of the locking gear, and a convex curved surface inclined inwards from a second end of the concave curved surface to a medial portion of a second surface of the locking gear, with external gear teeth formed in an outer surface of each of the locking gears, and a connection protrusion provided on a central portion of a rear surface of each of the locking gears, the connection protrusion being inserted into the corresponding outer guide hole of the main control disk; and
   a pair of locking gear support members interposed between the cam and the pair of locking gears, each of the locking gear support members having: a first contact surface in close contact with the concave curved surface of the support depression of the corresponding locking gear; and a second contact surface in close contact with a lower portion of a first surface of the guide block that is disposed adjacent to a second end of the locking gear, the locking gear support member being supported on both ends of an inner surface thereof by a circumferential outer surface of the cam.

2. The recliner for vehicle seats as set forth in claim 1, wherein the convex curved surface of the support depression of each of the locking gears is spaced apart from an outer surface of the corresponding locking gear support member by a predetermined distance.

3. The recliner for vehicle seats as set forth in claim 2, wherein the second contact surface of each of the locking gear support member which is in close contact with the lower portion of the first surface of the guide block that is disposed adjacent to the second end of the locking gear is inclined towards the lever rotating shaft from an upper end thereof to a lower end thereof.

4. The recliner for vehicle seats as set forth in claim 1, wherein a first end of the inner surface of each of the locking gears further extends towards the cam such that the first end of the inner surface of the locking gear is supported by a second end of the corresponding support protrusion of the cam.

5. The recliner for vehicle seats as set forth in claim 1, wherein the first end of each of the elastic members which supports the first end of the corresponding support protrusion of the cam is bent in a direction in which the cam rotates when entering an unlocked state.

6. The recliner for vehicle seats as set forth in claim 1, wherein a fitting part is provided at a predetermined position around a circumferential outer surface of the lever rotating shaft, the fitting part being inserted into the second insert hole of the guide plate, with planar portions formed on upper and lower portions of the fitting part, and triangular rotating angle limit protrusions are provided on upper and lower portions of the second insert hole of the guide plate, wherein edges of the triangular rotating angle limit protrusions are supported by the planar portions of the fitting part.

* * * * *